Patented Feb. 21, 1933

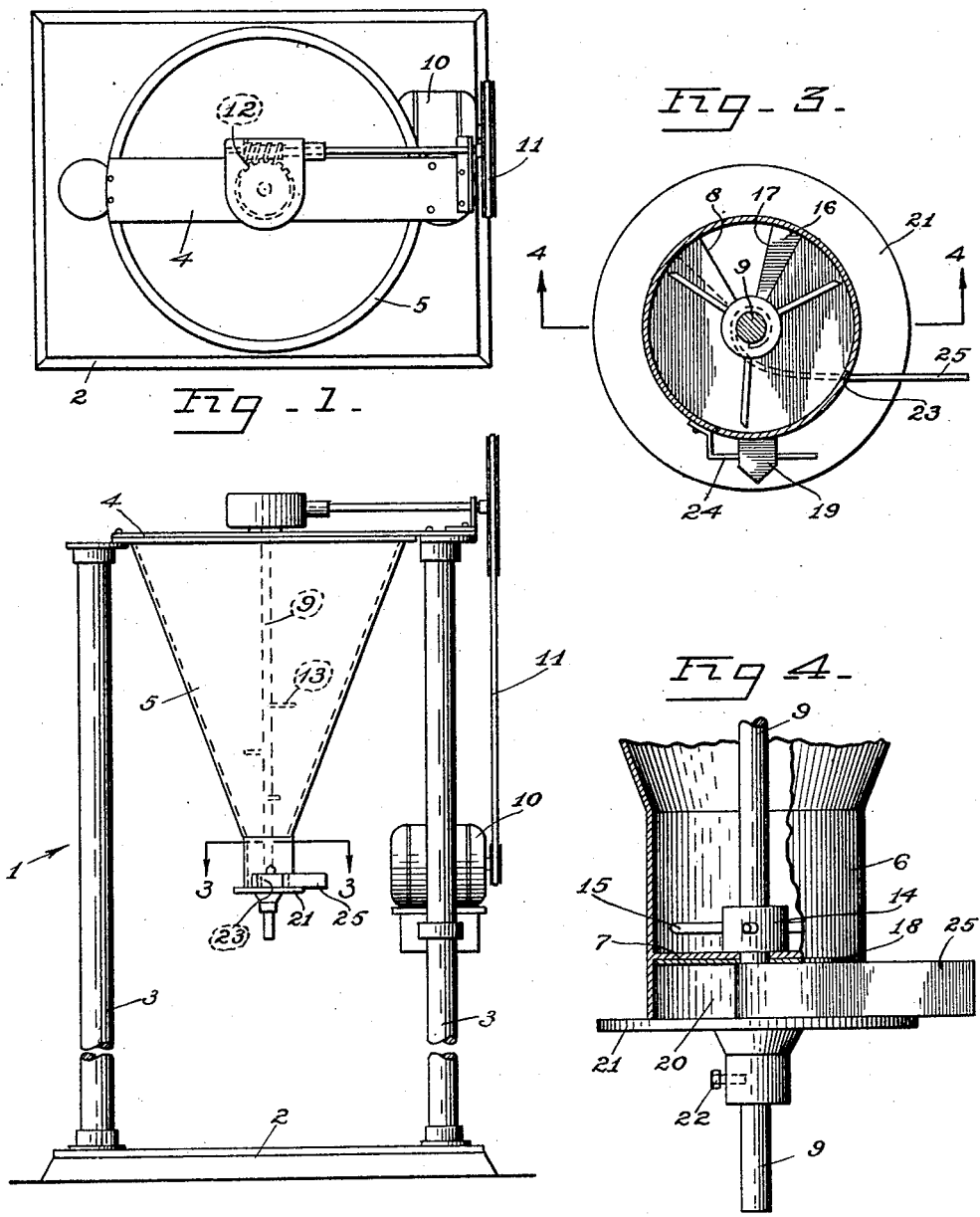

1,898,851

UNITED STATES PATENT OFFICE

GEORGE PIERETTI, OF SAN FRANCISCO, CALIFORNIA, ASSIGNOR TO DELRAY CORPORATION, OF SAN FRANCISCO, CALIFORNIA, A CORPORATION OF DELAWARE

CONTINUOUS FEEDING MECHANISM

Application filed February 18, 1931. Serial No. 516,810.

My invention relates to improvements in continuous feeding mechanism, and it consists in the combinations, constructions and arrangements hereinafter described and claimed.

An object of my invention is to provide a continuous feeding mechanism especially designed for feeding materials such as grated cheese. The device prevents the cheese from packing up and provides means for feeding a continuous stream of cheese from the receptacle.

The device makes use of a rotating disc which acts as a support for the body of grated cheese or other material, and I have found that such a construction will provide a continuous uniform feeding.

A further object of my invention is to provide a device of the type described which is extremely simple in construction and which is durable and efficient for the purpose intended.

Other objects and advantages will appear as the specification proceeds, and the novel features will be particularly pointed out in the appended claims.

My invention is illustrated in the accompanying drawing forming a part of this application, in which Figure 1 is a top plan view of the device.
Figure 2 is a side elevation.
Figure 3 is a section along the line 3—3 of Figure 2.
Figure 4 is a section along the line 4—4 of Figure 3.

In carrying out my invention I provide a frame indicated generally at 1 which may consist of a supporting base 2, upright 3 and a cross piece 4 disposed at the top of the upright.

A conical-shaped member 5 is secured to the cross piece 4 and to the upright 3 and carries the material which is to be fed from the device such as grated cheese. Figure 4 shows the bottom of the conical-shaped member 5 as terminating in a cylindrical portion 6, this portion having a partition 7 in which an opening 8 is provided (see Figure 3).

A shaft 9 extends vertically through the cone 5 and cylinder 6 and is drilled in the cross piece 4 and the partition 7. The shaft 9 is operatively connected to a source of power such as a motor 10 (see Figure 2) by a belt and pulley connection indicated generally at 11, and a worm and worm gear connection shown at 12 in Figure 1.

Projections 13 extend radially from the shaft 9 (see Figure 2) and aid in stirring up the material in the cone 5 thus preventing the particles from packing.

Figures 3 and 4 show a hub 14 mounted on the shaft 9 adjacent to the partition 7 and carrying radially extending projections 15. The projections 15 act in the same manner as the projections 13.

The opening 8 and the partition 7 may be covered by a disc-shaped slide 16 that has an opening 17 therein corresponding to the opening 8. A slot 18 in the cylinder 6 permits a handle 19 integral with the disc 16 to project exteriorly of the cylinder 6. The handle may be grasped and swung through an arc for regulating the size of the opening 8. The opening may be completely closed if desired.

A receptacle 20 is formed by the disc 16 and the portion of the cylinder 6 disposed below the disc. The bottom of the receptacle is closed by a rotatable disc 21 that is secured to the shaft 9 by a set screw 22 or other suitable fastening means.

The cylinder 6 has an opening 23 which extends substantially the height of the receptacle 20. The bottom 9 of the opening 23 is formed by the rotatable disc 21. The handle 19 slides on a scraper 25. (See Figure 4).

The scraper 25 has its inner end bent around the shaft 9 and the outer end may be grasped and swung so as to move the scraper over the disc 21. The scraper extends through the opening 23.

From the foregoing description of the various parts of the device the operation may be readily understood.

As already stated the material is pressed in the cone 5 and is prevented from packing by the projections 13 and 15. The weight of the material will cause it to feed through the opening 8 and the size of this opening is determined by the position of the disc 16. The material falls by gravity upon the rotating disc 21 and the disc revolves in a counter-clockwise direction when looking at Figure 3. The material will therefore be carried around by the disc 21 in the receptacle 20 until it strikes the scraper 25 whereupon it will be deflected out of the periphery of the disc and into any desired container, not shown. I have found that the weight of the material in the cone 5 and disposed above the opening 8 is supported by the disc 21 and that the continuous rotation of this disc at a uniform speed will cause a uniform flow of the material out through the opening 23.

Although I have shown and described one embodiment of my invention, it is to be understood that the same is susceptible of various changes, and I reserve the right to employ such changes as may come within the scope of the claims hereto annexed.

I claim:

1. A continuous feeding mechanism comprising a conical-shaped receptacle having a cylindrical lower portion, a partition disposed in the cylindrical portion and above the lower end, said partition having an opening therein, a rotatable shaft extending through the receptacle and partition, a disc secured to the shaft and closing the bottom of the cylindrical portion, said cylindrical portion having an opening in its side, a scraper extending from the shaft and through the opening and resting on the disc, and a closure member for the partition opening and being supported by the scraper.

2. A continuous feeding mechanism comprising a conical-shaped receptacle having a cylindrical lower portion, a partition disposed in the cylindrical portion and above the lower end, said partition having an opening therein, a rotatable shaft extending through the receptacle and partition, a disc secured to the shaft and closing the bottom of the cylindrical portion, said cylindrical portion having an opening in its side, a scraper extending from the shaft and through the opening and resting on the disc, a closure member for the partition opening and being supported by the scraper, and projections carried by the shaft and disposed above the partition.

3. A continuous feeding mechanism comprising a receptacle having an open end, a rotatable disc closing the open end, said receptacle having an opening in its side wall and being disposed adjacent to the disc, a partition for the receptacle and being disposed above the wall opening, said partition having an opening therein, a shaft for rotating the disc and extending above the partition, and projections carried by said shaft.

4. A continuous feeding mechanism comprising a receptacle having an open end, a rotatable disc closing the open end, said receptacle having an opening in its side wall and being disposed adjacent to the disc, means for deflecting material toward the wall opening, a partition for the receptacle and being disposed above the wall opening, said partition having an opening therein, a shaft for rotating the disc and extending above the partition, and projections carried by said shaft.

5. A continuous feeding mechanism comprising a receptacle having a false bottom with an adjustable opening therein, a movable bottom for the receptacle and being disposed below the false bottom, agitating means disposed in the receptacle for preventing packing of the material, and common means for operating the agitator and moving the bottom, said receptacle having an opening disposed between the false bottom and movable bottom for permitting steady outflow of material.

6. A continuous feeding mechanism comprising a receptacle having a false bottom with an adjustable opening therein, a movable bottom for the receptacle and being disposed below the false bottom, agitating means disposed in the receptacle for preventing packing of the material, common means for operating the agitator and moving the bottom, said receptacle having an opening disposed between the false bottom and movable bottom for permitting steady outflow of material, and a deflector resting on the movable bottom and being swingable for closing the last-named opening.

GEORGE PIERETTI.